United States Patent
Scriber

(10) Patent No.: US 10,454,688 B2
(45) Date of Patent: Oct. 22, 2019

(54) SYSTEMS AND METHODS FOR SECURE CERTIFICATE MANAGEMENT

(71) Applicant: CABLE TELEVISION LABORATORIES, INC, Louisville, CO (US)

(72) Inventor: Brian Alexander Scriber, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 239 days.

(21) Appl. No.: 15/345,427

(22) Filed: Nov. 7, 2016

(65) Prior Publication Data
US 2017/0134172 A1  May 11, 2017

Related U.S. Application Data

(60) Provisional application No. 62/252,155, filed on Nov. 6, 2015.

(51) Int. Cl.
*H04L 9/32* (2006.01)

(52) U.S. Cl.
CPC ............ *H04L 9/3263* (2013.01); *H04L 9/321* (2013.01)

(58) Field of Classification Search
CPC . H04L 63/0823; H04L 9/3268; H04L 9/3263; H04L 9/3013; H04L 9/14; H04L 9/3265; H04L 9/321; G06F 21/33
See application file for complete search history.

(56) References Cited

U.S. PATENT DOCUMENTS

| | | | |
|---|---|---|---|
| 2002/0150241 A1* | 10/2002 | Scheidt | H04L 9/321 380/44 |
| 2003/0065921 A1* | 4/2003 | Chang | G06Q 20/401 713/175 |

* cited by examiner

*Primary Examiner* — Brian F Shaw
(74) *Attorney, Agent, or Firm* — Armstrong Teasdale LLP

(57) ABSTRACT

A method for managing certificates includes the steps of transmitting, over an electronic network by an electronic device of a client, a certificate request to a certificate management portal separate from the client, establishing an interaction with an electronic interface of a certificate authority by the certificate management portal; generating, by the certificate authority, a certificate package, delivering the generated certificate package to the certificate management portal, and downloading from the certificate management portal, by the client, at least one certificate of the delivered certificate package.

14 Claims, 2 Drawing Sheets

SYSTEMS AND METHODS FOR SECURE CERTIFICATE MANAGEMENT

CROSS REFERENCE TO RELATED APPLICATIONS

This application claims the benefit of and priority to U.S. Provisional Patent Application Ser. No. 62/252,155, filed Nov. 6, 2015, which is incorporated herein by reference in its entirety.

BACKGROUND

The field of the disclosure relates generally to management of computer networks, and more particularly, to management of certificates and/or certificate authorities among clients and ecosystems over such networks.

In conventional networks that utilize certificate authorities, typically a direct relationship exists between a Certificate Authority (CA) and a client. That is, interactions between the CA and the client are handled directly. However, when a large ecosystem (e.g., a coalition of companies in the same industry) must be managed, conventional systems sometimes utilize a specialty Certificate Management Authority (CMA) company to manage the multiple and changing certificates issued among the ecosystem. In such circumstances, the CMA must not only understand the industry needs, but also must set and enforce security standards (cryptographic algorithms, encoding, naming, etc.). When a third party such as the CMA is involved, many cryptographic standards, processes and protocols, which are typically established for only two particular parties (e.g., the CA and the client), are no longer applicable. In other words, the cryptographic standards particular certificate does not consider the relationship of the CMA to the other parties, and therefore such three-party arrangements lack in trust and security.

FIG. 1 is a schematic illustration of a conventional certificate management system 100. System 100 includes an ecosystem member 102, a specialist (or consultant) 104 a CA 106 having an electronic interface 108, and an embedded device or application 110, and an ecosystem 112. For simplicity of explanation, one of ordinary skill in the art will understand that all of these elements of system 100 represent various electronic devices, computer systems, and/or software applications communicating over electronic network (cable, wired, and or wireless, etc.), and are not intended to refer to natural persons. In an exemplary embodiment, CA 106 may be a certificate authority hosting root certificate.

In operation, ecosystem member 102 transmits a communication 114 to specialist 104 to build an interaction with electronic interface 108 of CA 106. Once such interaction is established, ecosystem member 102 transmits a request 116 to CA 106 for one or more certificates (not shown) including one or more of related metadata, specialized request information and formats, and a Public Key (not shown) for ecosystem member 102. In an exemplary embodiment, request 116 is received by electronic interface 108 over an electronic network of system 100. Once request 116 is received by CA 106, CA 106 transmits a response 118 to ecosystem member 102 to acknowledge receipt of the certificate request (i.e., request 116).

After request 116 is received, CA 106 then further aggregates a certificate package, which includes an encryption 120 of the certificate package with a Private Key (not shown) of CA 106, and the Public Key of the ecosystem member 102 from request 116. Once the certificate package is aggregated, CA 106 transmits aggregated certificate package 122 to ecosystem member 102. Once aggregated certificate package 122 is received by ecosystem member 102, ecosystem member 102 performs a decryption 124 on aggregated certificate package 122 using the Private Key of CA 106. Ecosystem member 102 then transmits an acknowledgment 126 to CA 106 that acknowledges the receipt and successful decryption of aggregated certificate package 122.

After successful decryption 124 of aggregated certificate package 122, ecosystem member 102 then performs an embedding 128 of one or more decrypted certificates into individual embedded devices and/or software applications 110 associated with ecosystem member 102. Once so embedded, one or more of embedded devices and/or software applications 110 are subject to a deployment 130 within ecosystem 112, which requires the specific embedded certificates, along with the appropriate certificate chain and root of trust.

According to this conventional system 100, however, a change to CA 106, such as for a new single-source or as a second-source provider, ecosystem member 102 is required to further consult with specialist 104 to update interactions with CA 106, through electronic interface 108. Consultation with specialist 104 is also required when CA 106 changes electronic interface 108, which is known to happen frequently in the industry, or if there are any changes or concerns with electronic interface 108 coming from ecosystem member 102. Each of these consultations can involve an expensive and time-consuming process which is unique for each and every ecosystem member 102 affected by changes to CA 106 or electronic interface 108.

BRIEF SUMMARY

In an aspect, a method for managing certificates includes the steps of transmitting, over an electronic network by an electronic device of a client, a certificate request to a certificate management portal separate from the client, establishing an interaction with an electronic interface of a certificate authority by the certificate management portal; generating, by the certificate authority, a certificate package, delivering the generated certificate package to the certificate management portal, and downloading from the certificate management portal, by the client, at least one certificate of the delivered certificate package In another aspect, a system for managing certificate authorities within a computer network includes a certificate management portal, an electronic device of a client in electronic communication with the certificate management portal, and a plurality of certificate authorities each having a respective electronic interface in electronic communication with the certificate management portal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments herein describe and illustrate a secure certificate management system to more reliably guarantee trust in a three-party arrangement between a CA, a CMA, and a client or ecosystem member.

Figure 1:
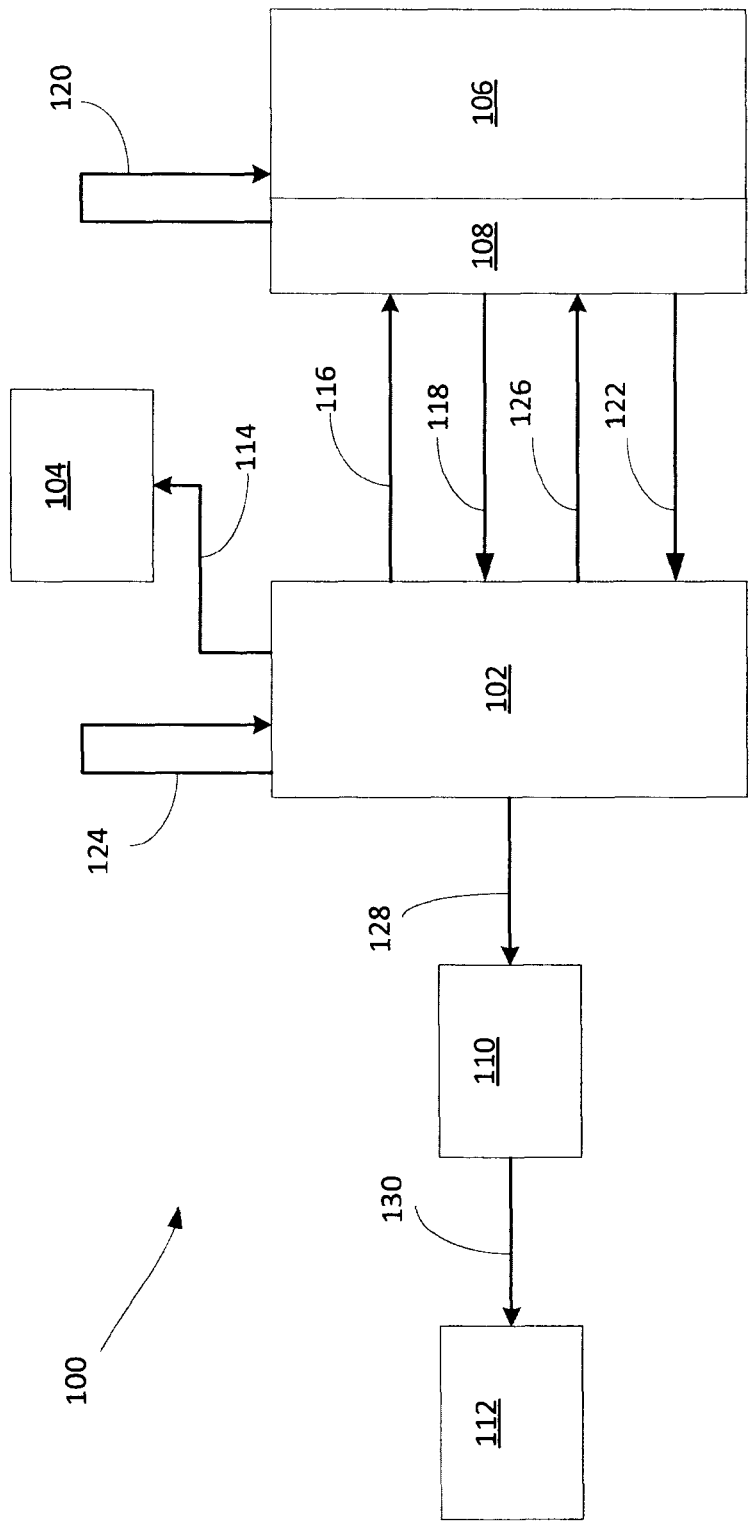
FIG. 1 is a schematic illustration of a conventional certificate management system.
Figure 2:
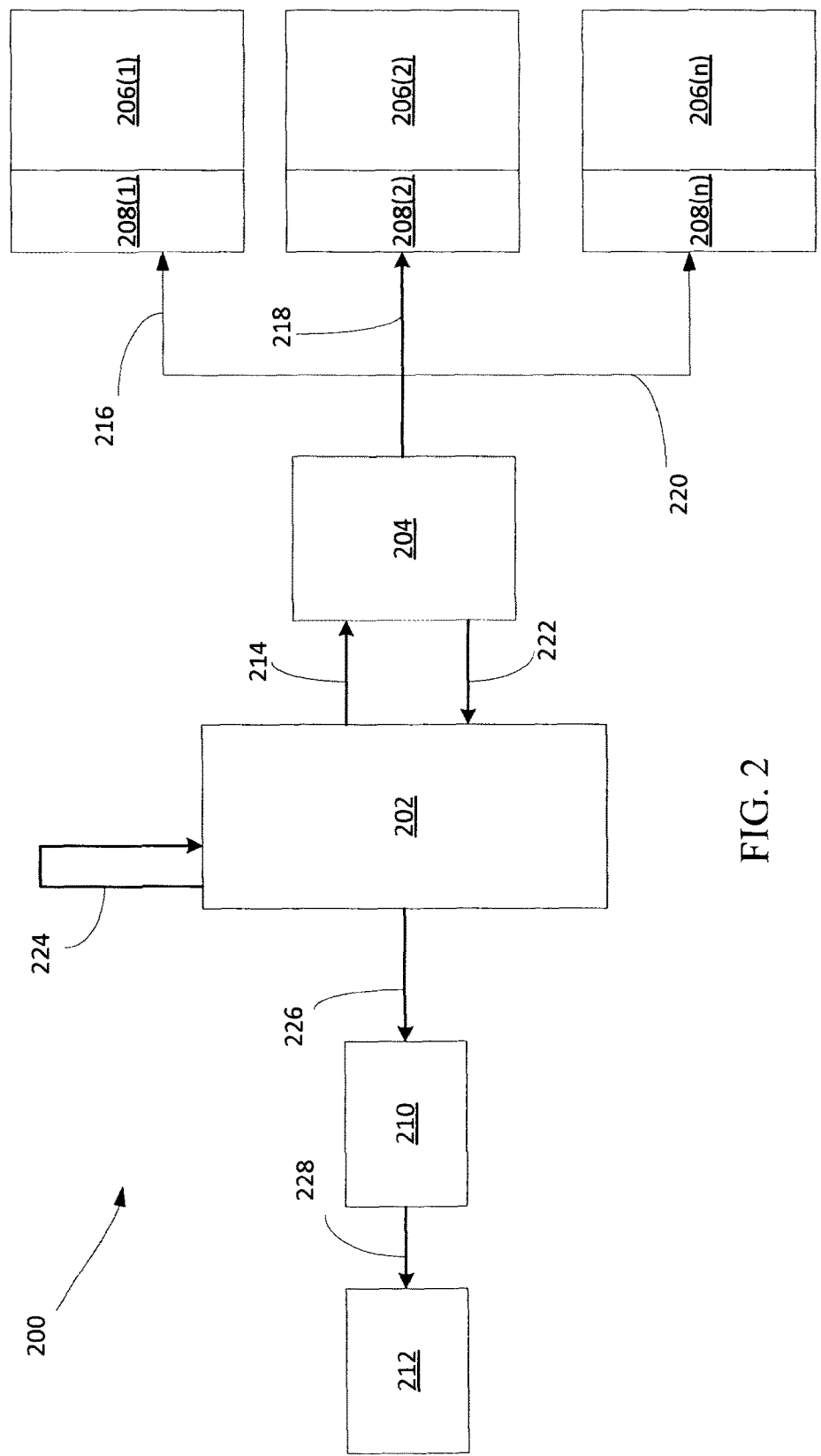
FIG. 2 is a schematic illustration of certificate management system, according to an embodiment.

FIG. 2 is a schematic illustration of certificate management system 200, according to an embodiment. System 200 includes an ecosystem member 202, a portal 204, one or more a certificate authorities 206 (206(1), 206(2), . . . 206(n)) having respective electronic interfaces 208 (208(1), 208(2), . . . 208(n)), one or more embedded devices or applications 210, and an ecosystem 212. Again, for simplicity of explanation, one of ordinary skill in the art will understand that all of these elements of system 200 also represent various electronic devices, computer systems, and/ or software applications communicating over electronic network (cable, wired, and or wireless, etc.), and are not intended to refer to natural persons. In an exemplary embodiment, CA 206 may represent a certificate authority hosting root certificate. Additionally, portal 204 may represent a certificate issuance portal, which may include, without limitation, one or more of a computer system, a server, a webpage, and a web service.

In operation, ecosystem member 202 transmits a certificate request 214 to portal 204 for one or more certificates (not shown) including one or more of related metadata, specialized request information and formats, and a Public Key (not shown) for ecosystem member 202. In an exemplary embodiment, request 214 represents a request for certificates that have been approved of trust for ecosystem 212 that requires certificates. Once request 216 received by portal 204, portal 204 establishes an interaction 216 with a first electronic interface 208(1) of a first CA 206(1). Alternatively, or additionally, portal 204 establishes an interaction 218 with a second electronic interface 208(2) of a second CA 206(2), and/or an interaction 220 with one or more other electronic interfaces 208(n) of other CAs 206(n). In an exemplary embodiment, portal 204 functions to verify and monitor that each CA 206 is approved and/or appropriate for ecosystem 212. According to this example, there is no necessary direct interaction ecosystem member 202 and any particular CA 206. CA 206 may aggregate certificate packages from request receipts directly with portal 204.

In an exemplary embodiment, interactions 216, 218, 220 are not limited to a particular form of communication or specific interaction, and may include, without limitation, functions including one or more of managing requests, acknowledgements, notifications, downloads, and or notifications of where and how certificates are being deployed for a particular customer, ecosystem member 202, or embedded device or software application 210. In an exemplary embodiment, portal 204 utilizes one or more of various protocols, and may function to abstract one or more of electronic interfaces 208 to simplify the view on a display (not shown) of ecosystem member 202. According to the examples illustrated herein, portal 204 is further capable to insulate ecosystem member 202 from potential changes to one or more of electronic interfaces 208 and or participating CAs 206.

Once a certificate or certificate package is generated by CA 206 using the Public Key (not shown) of ecosystem member 202, as well as the Private Key of the particular CA 206(1, 2, . . . n), interactions 216, 218, 220 may further include a delivery of encrypted certificates through portal 204. Alternatively, portal 204 can be configured to communicate a specific uniform resource identifier (URI) provided by CA 206. Once the encrypted certificates are delivered to portal 204, ecosystem member 202 performs a download 222 of the encrypted certificates from portal 204. Once downloaded, ecosystem number 202 performs a decryption 224 of the download 222 using the Private Key (not shown) for ecosystem member 202 associated with a particular CA 206.

After successful decryption 224 of encrypted certificates from portal 204, ecosystem member 202 then performs an embedding 226 of one or more decrypted certificates into individual embedded devices and/or software applications 210 associated with ecosystem member 200 to. Once so embedded, one or more of embedded devices and/or software applications 210 are subject to a deployment 228 within ecosystem 212, which requires the specific embedded certificates, along with the appropriate certificate chain and root of trust. In an exemplary embodiment, ecosystem 212 is configured to verify that deployed certificates are chained to a trusted and approved root.

In an exemplary embodiment, portal 204 is created and/or run by an individual CMA (not shown) for one or more of, without limitation, communication of standards, multifactor authentication, individual authorization, and management of account information. Portal 204 is further capable of managing the creation of Private and Public Keys for a particular client or ecosystem member 202 based on the certificate or certificate packages issued by a particular CA 206. Portal 204 is thus capable of taking responsibility that the created Private and Public Keys are delivered to the client/ecosystem member. In an exemplary embodiment, such Private and Public Keys are delivered in person, or through tamper-evident envelopes and secure shipping. In an alternative embodiment, keys can also be created by the client (e.g., ecosystem member 202), and a cryptographic key exchange (e.g., a Diffie-Hellman key exchange) may occur in order to avoid risks that may be prevalent with the manual transfer keys, such as sophisticated "man-in-the-middle" attacks, in which some secret keys may be exposed even with the use of tamper-evident envelopes.

In an exemplary embodiment, portal 204 is further configured to manage the creation of Private and Public Keys for the CMA that runs portal 204, based on the certificate or certificate packages issued by the particular CA 206. From portal 204, clients/ecosystem members 202 are rendered able to request certificates from a particular CA 206, but indirectly through portal 204 of the CMA. Through the intervention of portal 204, the CMA is rendered able to itself create a certificate request from CA 206 (through one or more of interactions 216, 218, 220). In an exemplary embodiment, such requests are encrypted using the Private Key of the CMA and the Public Key of CA 206, and may be transmitted to CA 206 by way of one or more protocols or web services (e.g., Simple Object Access Protocol (SOAP), REpresentational State Transfer (Rest), described below).

Such certificate requests can take a long period of time to be satisfied, as some such requests include up to tens of thousands of certificates. Additionally, such requests may include non-sequential certificate IDs, and a CA may be required to verify each such certificate ID to check if the ID has previously been issued. In an exemplary embodiment, once certificate generation is completed according to the certificate requests, CA 206 will respond to the CMA (e.g., through interactions 216, 218, 220) with a list of errors, a summary of issued certificates, and a location where an encrypted batch of issued certificates is stored, and also where a secure download may take place.

In an exemplary embodiment, the CMA need not itself download the issued certificates, but may instead function to manage the accounting of issued certificates for ecosystem member 202 based on the issued and nonissued (e.g., due to error, described below) certificate requests. According to this embodiment, ecosystem member 202 or the client is notified by the CMA, and ecosystem member 202 may then log into secure portal 204, follow the secure URI from where the encrypted batch of certificates can be downloaded, and then downloads the encrypted file or batch directly from CA 206, as opposed to directly from the CMA (or portal 204). Once downloaded, ecosystem member 202 may use its own Private Key to decrypt (e.g., decryption 224) the batch of certificates that would then be ready to be embedded and deployed (e.g., embedding 226 and deployment 228, respectively).

According to an exemplary embodiment, the CMA is configured to operate with one or more CAs 206 to house root certificates, and operate the Public Key infrastructure (PKI) for an entire ecosystem. In this example, such an intermediary role requires that both ecosystem member 202/client and CA 206 trust the CMA, and also that ecosystem member 202/client trust CA 206 in all dealings. According to the embodiments described herein, the exemplary systems and methods function to automate and better guarantee this trust model.

According to the exemplary systems and methods described herein, CA 206 may issue keys to the CMA, and these issued keys may be delivered to ecosystem member 202 through secure online portal 204. In an exemplary embodiment, portal 204 is further configured to define the interface for a protocol between the CMA and a particular CA 206 with respect to one or more of, without limitation, ordering, error-management, re-issuance, and revocation (e.g., through a web service).

In an exemplary embodiment, the web services available to a particular CA 206 for communication with the CMA (through portal 204), for purposes of certificate issuance and communication with the CMA, include, without limitation, SOAP and REST (sometimes referred to as "RESTful").

Under SOAP, remote processes may be accessed using data transferred within an eXtensible Markup Language (XML) document protocol defined by an agreed-upon standard, such as the Web Services Definition Language (WSDL). SOAP is a strongly typed approach, which allows for easy validation, but may require additional efforts to manage, update, and develop against, particularly during initial development.

The REST web service, which is not always considered to be a protocol per se, utilizes an underlying Hypertext Transfer Protocol (HTTP), and one or more key methods such as, without limitation, GET, POST, PUT, and DELETE. Under REST, ecosystem members 202 (or clients) are able to communicate with a server to move data based on name-value pairs and simple and/or stateless communications. REST functions similarly to a normal web server, if such key methods are available, a GET method, for example, would be used to look up and return information of interest to a client, whereas a DELETE method would remove such generated content from the server. REST is a loosely typed interface approach, which is more difficult to validate, but allows for ease of use for simple interactions where more minimal data is considered to be passing to and from the parties.

According to an exemplary embodiment, one or more of the following two key interfaces/processes may be utilized, without limitation, with the web services/protocols described above: "certificates_ready;" and "certificates_downloaded." The certificates_ready and certificates_downloaded processes may be generally implemented with the REST web service interface available to particular CAs 206 interacting with portal 204, and may also include status and accounting operations of both REST and SOAP, as well as other communications not requiring the strongly-typed structure of the SOAP protocol.

According to an exemplary embodiment, the certificates_ready process may be invoked after a request has been received, validated, and subsequent to the certificates being created and portal 204 is authorized for download from ecosystem member 202. When a particular CA 206 calls the certificates_ready process from the CMA host (e.g. through portal 204), the CMA is configured to log such activity and notify both ecosystem member 202 and the CMA administrator (not separately shown). The return of an HTTP status code of 200 (shown below) indicates success of this operation, and alternate HTTP status codes indicate failure, and the potential cause thereof, as shown below.

In an exemplary embodiment, the certificates_downloaded process may be invoked after ecosystem member 202 has successfully downloaded the certificate package (e.g., download 222) from a server (not separately shown) of a particular CA 206. Upon receipt of the certificates_downloaded invocation (e.g. through portal 204), the CMA is configured to log a call to the audit history for an account of ecosystem member 202 and complete a sales transaction, as well as notification to the CMA administrator, for such activity. Similar to the certificates_ready process, described above, the return of an HTTP status code of 200 (shown below) indicates success of this operation, and alternate HTTP status codes indicate failure, and the potential cause thereof, as shown below.

According to an exemplary embodiment, the certificates_ready process allows a particular CA 206 to notify the CMA that a certificate request has been received, validated, and processed. Once the CMA is so notified (e.g., through interactions 216, 218, 220) that CA 206 has created a certificate package and has populated a download portal accessible only to ecosystem member 202 with the specified universal serial bus (USB) token, the CMA may then alert ecosystem member 202 of the available download. Expected parameters for successful execution of the certificates_ready process are shown below in TABLE 1. In an exemplary embodiment, these expected parameters may occur in a different order than shown in TABLE 1.

TABLE 1

| PARAMETER NAME | PARAMETER DESCRIPTION |
| --- | --- |
| account | Account number pulled from initial certificate request |
| request_id | Request ID pulled from initial certificate request |
| type | The type of certificates requested {e.g., 0, 1, 2, etc.} It should be noted here that this numerical order presents merely one way to represent requested certificates. Each ecosystem may have different uses or types of certificates, and many other types and/or uses of certificates are available. |
| num_certs | The count of certificates generated (this should match initial request unless errors or overlap occurred) |
| increment | The difference between each certificate generated |
| start_at | The starting point for all generated certificates |
| ending_prior | The next available certificate number, NOT the last certificate generated |
| download_from | The uniform resource locator (URL) for use in downloading the certificate package |

According to this certificates_ready process, upon receipt of an appropriate server operations message, the CMA is further configured to record a status change and notify both ecosystem member 202 and the CMA administrator that a download package is ready. The return of particular HTTP status codes are used to indicate success or failure, as described above. Exemplary HTTP status codes that may be used with the certificates_ready process are shown below in TABLE 2.

TABLE 2

| Code | Title | Meaning |
| --- | --- | --- |
| 200 | OK | Success (General) |
| 201 | Created | Expected response. Message received, recorded, state changed successfully, and notifications sent to both subscriber and the CMA administrator. |
| 400 | Bad Request | Syntax issues associated with the submission. Potentially misspelled parameters or illegal characters in the values. |
| 403 | Forbidden | Client not authorized to make the request. NOTE: This interface is stateless and will not offer the 401 Unauthorized response. Should the client receive this error, the request must be made again once authorization is received. |
| 404 | Not Found | Could not find the resource requested. Potentially a misspelled method name or bad URL. |
| 405 | Method Not Allowed | Using GET/DELETE/PUT for this method's POST based access. Review the type of access and the support for this method and the client access code. |
| 500 | Server Error | Something went wrong during the processing of this call. The entire transaction is voided. No retry will be performed (presumably the same action thing will occur again). Notification will have been sent to the CMA administrator advising them to review the logs and message failure. |
| 501 | Not Implemented | The method being invoked has not been implemented (yet). No notifications will be sent to the CMA administrator. |

In an exemplary embodiment, the certificates_downloaded process allows a particular CA 206 to notify the CMA that a certificate package has been successfully downloaded by ecosystem member 202. Once the CMA is so notified (e.g., through interactions 216, 218, 220) that CA 206 has verified the USB token of ecosystem member 202, and that the complete package has been downloaded, the CMA is configured to then request accounting progresses and notified the CMA administrator that the request status is now complete. In an alternative embodiment, ecosystem member 202 may also be so notified, if desired.

Expected parameters for successful execution of the certificates_downloaded process are shown below in TABLE 3. In an exemplary embodiment, these expected parameters may occur in a different order than shown in TABLE 3.

TABLE 3

| PARAMETER NAME | PARAMETER DESCRIPTION |
| --- | --- |
| account | Account number pulled from initial certificate request |
| request_id | Request ID pulled from initial certificate request |
| timestamp | The date and time (as a string) for when the certificates were downloaded |

According to this certificates_downloaded process, upon receipt of an appropriate server operations message, the CMA is further configured to record a status change and notify the CMA administrator that the download package has been successfully downloaded. In an exemplary embodiment, no notification is sent to ecosystem member 202 of the successful download, since ecosystem member 202 should be aware of their own successful download using the USB token. In an alternative embodiment, ecosystem member 202 may also be sent a separate notification of the successful download. The return of particular HTTP status codes are used to indicate success or failure, as described above. Exemplary HTTP status codes that may be used with the certificates_downloaded process are shown below in TABLE 4.

TABLE 4

| Code | Title | Meaning |
|---|---|---|
| 200 | OK | Success (General) |
| 201 | Created | Expected response. Message received, recorded, state changed successfully, and notifications sent to both subscriber and the CMA administrator. |
| 400 | Bad Request | Syntax issues associated with the submission. Potentially misspelled parameters or illegal characters in the values. |
| 403 | Forbidden | Client not authorized to make the request. NOTE: This interface is stateless and will not offer the 401 Unauthorized response. Should the client receive this error, the request must be made again once authorization is received. |
| 404 | Not Found | Could not find the resource requested. Potentially a misspelled method name or bad URL. |
| 405 | Method Not Allowed | Using GET/DELETE/PUT for this method's POST based access. Review the type of access and the support for this method and the client access code. |
| 500 | Server Error | Something went wrong during the processing of this call. The entire transaction is voided. No retry will be performed (presumably the same action thing will occur again). Notification will have been sent to the CMA administrator advising them to review the logs and message failure. |
| 501 | Not Implemented | The method being invoked has not been implemented (yet). No notifications will be sent to the CMA administrator. |

According to the exemplary systems and methods described and illustrated herein, vendors and manufacturers will realize a better user experience than what is presently available for the slow certificate issuance process of the conventional system. Additionally, utilization of the exemplary portal systems and methods herein are particularly advantageous providers of secure communication networks, including, but not limited to, the cable industry and broadband providers such as telephony, cellular, community Wi-Fi, etc. under these advantageous systems and methods, the speed-to-market for manufactured endpoint devices is significantly expedited.

The present systems and methods also further allow a CMA better manage CA activities within select, thereby rendering such systems more efficient to generate material revenue from the subsequent certificate issuance. The present systems and methods further allow a CMA, by more efficiently and securely managing trust relationships between parties, to more deeply penetrate security provider market more efficiently generate a per certificate revenue by managing all of the certificates in particular market through a centralized portal, and thus eliminate the need for each client/member to separately manage certificate with each particular CA and its associated electronic interface.

Exemplary embodiments of certificate management systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for managing certificates, the method comprising the steps of:
    receiving, over an electronic network by a certificate management portal, a certificate request from an electronic device of a client separate from the certificate management portal;
    establishing, after the step of receiving, an interaction with an electronic interface of a certificate authority by the certificate management portal;
    generating, by the certificate authority and after the step of establishing, an aggregated certificate package;
    delivering, after the step of generating, the generated aggregate certificate package to the certificate management portal; and downloading, after the step of delivering, directly from the certificate authority to the client, at least one certificate of the delivered aggregate certificate package.

2. The method of claim 1, wherein the client is a member of an ecosystem.

3. The method of claim 1, wherein the certificate management portal comprises at least one of a computer system, a server, a webpage, and a web service.

4. The method of claim 1, wherein the certificate management portal comprises a portion of a certificate management authority.

5. The method of claim 1, wherein the certificate management portal is controlled by a separate certificate management authority.

6. The method of claim 1, wherein the certificate authority comprises a plurality of certificate authorities.

7. The method of claim 1, wherein the certificate authority comprises a certificate authority hosting root certificate.

8. The method of claim 1, further comprising the step of verifying, by the certificate management portal, that the certificate authority is approved for the client.

9. The method of claim 1, further comprising the step of managing, by the certificate management portal, at least one of a request, an acknowledgement, a notification, and a download from one or both of the client and the certificate authority.

10. The method of claim 1, further comprising the step of abstracting, by the certificate management portal, the electronic interface of the certificate authority for viewable display at the electronic device of the client.

11. The method of claim 1, wherein the step of downloading comprises a communication, from the certificate management portal to the electronic device of the client, including a uniform resource identifier provided by the certificate authority.

12. The method of claim 1, further comprising the step of encrypting the generated aggregate certificate package prior to the step of delivering.

13. The method of claim 12, further comprising the step of decrypting, by the electronic device of the client, at least one encrypted certificate of the delivered aggregate certificate package.

14. The method of claim 13, further comprising the step of embedding the at least one decrypted certificate on an electronic device of an ecosystem.

* * * * *